US 9,245,205 B1
Jan. 26, 2016

(12) United States Patent
Soldevila

(10) Patent No.: US 9,245,205 B1
(45) Date of Patent: Jan. 26, 2016

(54) SUPERVISED MID-LEVEL FEATURES FOR WORD IMAGE REPRESENTATION

(71) Applicant: Xerox Corporation, Norwalk, CT (US)

(72) Inventor: Albert Gordo Soldevila, Grenoble (FR)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 14/503,539

(22) Filed: Oct. 1, 2014

(51) Int. Cl.
G06K 9/62 (2006.01)
G06K 9/72 (2006.01)
G06K 9/46 (2006.01)

(52) U.S. Cl.
CPC .............. G06K 9/624 (2013.01); G06K 9/4642 (2013.01); G06K 9/726 (2013.01)

(58) Field of Classification Search
USPC ......... 382/159, 160, 170, 171, 209, 224, 278; 358/537, 538, 452, 453
See application file for complete search history.

(56) References Cited

U.S. PATENT DOCUMENTS

| 5,321,770 | A | 6/1994 | Huttenlocher et al. | |
|---|---|---|---|---|
| 5,539,841 | A | 7/1996 | Huttenlocher et al. | |
| 5,557,689 | A | 9/1996 | Huttenlocher et al. | |
| 5,640,466 | A | 6/1997 | Huttenlocher et al. | |
| 5,687,253 | A | 11/1997 | Huttenlocher et al. | |
| 6,249,604 | B1 | 6/2001 | Huttenlocher et al. | |
| 7,573,593 | B2 * | 8/2009 | Hart | H04N 1/00127 348/14.03 |
| 7,676,081 | B2 * | 3/2010 | Blake | G06K 9/00234 358/538 |
| 7,936,923 | B2 * | 5/2011 | Liu | G06K 9/38 382/173 |
| 8,103,093 | B2 * | 1/2012 | Blake | G06K 9/00234 358/538 |
| 8,125,440 | B2 * | 2/2012 | Guyot-Sionnest | G06F 3/014 345/156 |
| 8,442,319 | B2 * | 5/2013 | Sarkar | G06K 9/00456 382/159 |
| 8,649,600 | B2 * | 2/2014 | Saund | G06K 9/00449 382/175 |
| 2014/0219563 | A1 | 8/2014 | Rodriguez-Serrano et al. | |

OTHER PUBLICATIONS

U.S. Appl. No. 14/054,998, filed Oct. 16, 2013, Serrano et al.
D. Aldavert et al., "Integrating Visual and Textual Cues for Query-by-String Word Spotting", in ICDAR, 2013, 5 pages.
J. Almazán et al., "Efficient exemplar word spotting", in BMVC, 2012, 24 pages.
J. Almazán et al., "Handwritten word spotting with corrected attributes", in ICCV, 2013, 8 pages.
J. Almazán et al., "Word spotting and recognition with embedded attributes", Technical report, 2014, 17 pages.
A. Bissacco et al., "PhotoOCR: Reading Text in Uncontrolled Conditions", in ICCV, 2013, pp. 785-792.
Y.-L. Boureau et al., "Learning mid-level features for recognition", in CVPR, 2010, pp. 2559-2566.
G. Csurka et al., "Visual Categorization with Bags of Keypoints", in ECCV Workshop on Statistical Learning in Computer Vision, 2004, 16 pages.
V. Goel et al., "Whole is greater than sum of parts: Recognizing scene text words", in ICDAR, 2013, 5 pages.
Y. Gong et al., "A multi-view embedding space for modeling internet images, tags, and their semantics", IJCV, 2013, 24 pages.

(Continued)

Primary Examiner — Yosef Kassa
(74) Attorney, Agent, or Firm — Fay Sharpe LLP

(57) ABSTRACT

Disclosed is a method and system to learning mid-level features for text images that leverages character bounding box annotations. According to an exemplary embodiment, the disclosed method and system includes extracting semantic local descriptors by aggregating local statistics of small patches and correlating them with character bounding box annotations.

26 Claims, 8 Drawing Sheets

(56) References Cited

OTHER PUBLICATIONS

H. Hotelling, "Relations between two sets of variables", Biometrika, 1936, 58 pages.

H. Jégou et al, "Negative evidences and co-occurrences in image retrieval: The benefit of PCA and whitening", in ECCV, 2012, 14 pages.

M. Juneja et al., "Blocks that shout: Distinctive parts for scene classification", in CVPR, 2013, 8 pages.

D. Karatzas et al., "ICDAR 2011 Robust Reading Competition—Challenge 1: Reading Text in Born-Digital Images", in ICDAR, 2011, 6 pages.

D. Kumar et al., "Benchmarking recognition results on camera captured word image datasets", in Document Analysis and Recognition, 2012, 8 pages.

S. Lucas et al., "ICDAR 2003 Robust Reading Competition", in ICDAR, 2003, 18 pages.

A. Mishra et al., "Scene text recognition using higher order language priors", in BMVC, 2012, 11 pages.

A. Mishra et al., "Top-down and bottom-up cues for scene text recognition", in CVPR, 2012, 8 pages.

L. Neumann et al., "Scene Text Localization and Recognition with Oriented Stroke Detection", in ICCV, 2013, 8 pages.

F. Perronnin et al., "Fisher Kernels on Visual Vocabularies for Image Categorization", in CVPR, 2007, 13 pages.

F. Perronnin et al., "Large-scale image retrieval with compressed fisher vectors", in CVPR, 2010, 8 pages.

F. Perronnin et al., "Fisher kernels for handwritten word-spotting", in ICDAR, 2009, 5 pages.

F. Perronnin et al., "Improving the Fisher kernel for large-scale image classification", in ECCV, 2010, 14 pages.

M. Rusiñol et al., "Browsing heterogeneous document collections by a segmentation-free word spotting method", in ICDAR, 2011, 5 pages.

J. A. Rodríguez-Serrano et al., "Label embedding for text recognition", in BMVC, 2013, 11 pages.

A. Shahab et al., "ICDAR 2011 Robust Reading Competition—Challenge 2: Reading Text in Scene Images", in ICDAR, 2011, 6 pages.

V. Sharmanska et al., "Learning to Rank Using Privileged Information", in ICCV, 2013, 8 pages.

K. Simonyan et al., "Deep fisher networks for large-scale image classification", in NIPS, 2013, 9 pages.

V. Vapnik et al., "A New Learning Paradigm: Learning Using Privileged Information", Neural Networks, 2009, 14 pages.

K. Wang et al., "End-to-end Scene Text Recognition", in ICCV, 2011, 8 pages.

J. Weinman et al., "Scene Text Recognition Using Similarity and a Lexicon with Sparse Belief Propagation", TPAMI, 2009, 39 pages.

C. Yao et al., "Strokelets: A Learned Multi-Scale Representation for Scene-Text Recognition", in CVPR, 2014, 2 pages.

\* cited by examiner

SUPERVISED MID-LEVEL FEATURES FOR WORD IMAGE REPRESENTATION

CROSS REFERENCE TO RELATED PATENTS AND APPLICATIONS

U.S. patent application Ser. No. 14/601,802, filed Jan. 21, 2015 by A. Gordo, J. A. Rodriguez, and F. Perronnin, entitled "METHOD AND SYSTEM TO PERFORM TEXT-TO-IMAGE QUERIES WITH WILDCARDS"; U.S. patent application Ser. No. 14/497,417, filed Sep. 26, 2014 by J. A. Rodriguez and F. Perronnin, entitled "MULTI-QUERY PRIVACY-PRESERVING PARKING MANAGEMENT SYSTEM AND METHOD"; and U.S. patent application Ser. No. 14/054,998, filed Oct. 16, 2013, by J. Rodriguez-Serrano, F. Perronnin, H. Poirier, F. Roulland, and V. Ciriza, entitled "DELAYED VEHICLE IDENTIFICATION FOR PRIVACY ENFORCEMENT", are incorporated herein by reference in their entirety.

BACKGROUND

This disclosure relates to learning word image representations, i.e., given an image of a word, finding a descriptive and robust, fixed-length representation of the word. Machine learning techniques can then be used on top of these representations to produce models useful for word retrieval or recognition tasks. Although the focus of this disclosure is recognizing text in the wild, e.g., street signs, this disclosure and the exemplary embodiments provided herein have broad applications and can be used for the recognition of standard printed text, handwritten text, license plates, etc.

In recent years, a new trend in word image recognition and retrieval has been to describe word images with global representations using standard computer vision features, e.g., HOG (Histogram of Oriented Gradients), or SIFT (Scale-Invariant Feature Transform) features aggregated with bags of words, see G. Csurka, C. R. Dance, L. Fan, J. Willamowski, and C. Bray, "Visual Categorization with Bags of Keypoints", in ECCV Workshop on Statistical Learning in Computer Vision, 2004, or Fisher vector, see F. Perronnin and C. R. Dance, "Fisher Kernels on Visual Vocabularies for Image Categorization", in CVPR, 2007, encodings, and apply different frameworks and machine learning techniques, such as using attributes representations, metric learning, or exemplar SVMs (Support Vector Machines), on top of these global representations to learn models to perform tasks such as recognition, retrieval, or spotting. See F. Perronnin and J. A. Rodriguez-Serrano, "Fisher kernels for handwritten word-spotting", in ICDAR, 2009; M. Rusiñol, D. Aldavert, R. Toledo, and J. Lladós, "Browsing heterogeneous document collections by a segmentation-free word spotting method", in ICDAR, 2011; J. Almazán, A. Gordo, A. Fornés, and E. Valveny, "Efficient exemplar word spotting", in BMVC, 2012; D. Aldavert, M. Rusiñol, R. Toledo and J. Lladós, "Integrating Visual and Textual Cues for Query-by-String Word Spotting", in ICDAR, 2013; J. Almazán, A. Gordo, A. Fornés, and E. Valveny, "Handwritten word spotting with corrected attributes", in ICCV, 2013; J. A. Rodriguez-Serrano and F. Perronnin, "Label embedding for text recognition", in BMVC, 2013; J. Almazán, A. Gordo, A. Fornés, and E. Valveny, "Word spotting and recognition with embedded attributes", Technical report, 2014. This disclosure diverges from traditional approaches that mostly focus on detecting and localizing individual characters in a word image and then using that information to infer the contents of the word, using for example Conditional Random Fields and language priors. See A. Mishra, K. Alahari, and C. V. Jawahar, "Scene text recognition using higher order language priors", in BMVC, 2012; A. Mishra, K. Alahari, and C. V. Jawahar, "Top-down and bottom-up cues for scene text recognition", in CVPR, 2012; A. Bissacco, M. Cummins, Y. Netzer, and H. Neven, "PhotoOCR: Reading Text in Uncontrolled Conditions", in ICCV, 2013; and L. Neumann and J. Matas, "Scene Text Localization and Recognition with Oriented Stroke Detection", in ICCV, 2013.

The global approaches have important advantages such as not requiring words annotated with character bounding boxes for training or not requiring to explicitly localize characters inside the words at testing time, which is slow and error prone. Global approaches can also produce compact signatures which are relatively fast to compute, store and index, or compare, while still obtaining very competitive results in many tasks. The use of off-the-shelves computer vision features and machine learning techniques also makes them very attractive since they are usually very easy to implement. Yet, it may be argued that learning more semantic features that specialize in text instead of directly using generic features such as SIFT or HOG can potentially lead to large improvements.

In an orthogonal direction, it has been noted that methods that detect individual characters can yield very impressive results on recognition tasks when training with huge amounts of words annotated with character bounding boxes. See A. Bissacco, M. Cummins, Y. Netzer, and H. Neven, "PhotoOCR: Reading Text in Uncontrolled Conditions", in ICCV, 2013. However, this suffers from all the aforementioned disadvantages: need to annotate very large amounts of words at the character level, need to localize the characters at test time, and not leading to an amenable final signature that can be used for other tasks such as word retrieval.

This disclosure, and the exemplary embodiments described herein, describes an approach to leverage character bounding box information at training time to construct global image representations learned in a supervised way, as opposed to standard global representations that only involve an unsupervised learning stage. The methods and systems provided involve learning mid-level local features that are correlated with the characters in which they tend to appear. A small external dataset annotated at the character level is used to learn how to transform small groups of locally aggregated low-level features into mid-level semantic features suitable for text analysis. This is achieved by describing blocks of images using two modalities: a semantic modality, based on the character annotations; and a visual modality, based only on the image, and subsequently learning how to project the visual and the annotated modalities into a common subspace. Described also is how to apply this transformation in an efficient manner to new images at testing time.

The disclosed global image representation method and system has the following potential advantages:

Leverages character bounding boxes at training time to provide discriminative information that can significantly improve the final accuracy of the system. Global representations have not leveraged this information in the past.

Prior methods that have leveraged character bounding boxes were focused on recognition and did not produce a global image representation. Consequently, this makes them less useful for other tasks such as text-to-image or image-to-image retrieval. Mid-level features associated with the global image representation provided herein can be aggregated into a compact global representation, for example, but not limited to, as low as 96 dimensions, and directly used for image-to-image, text-to-image, and image-to-text retrieval tasks.

The global representation method and system provided herein can be learnt with very little annotated data. The best performing method known previously on scene-text recognition requires millions of annotated training samples with bounding boxes. See A. Bissacco, M. Cummins, Y. Netzer, and H. Neven, "PhotoOCR: Reading Text in Uncontrolled Conditions", in ICCV, 2013. In comparison, the disclosed approach achieves better results with less than 2,000 samples annotated with bounding boxes.

Many previous works focus on recognition learn character models for isolated characters. See A. Mishra, K. Alahari, and C. V. Jawahar, "Scene text recognition using higher order language priors", in BMVC, 2012; A. Mishra, K. Alahari, and C. V. Jawahar, "Top-down and bottom-up cues for scene text recognition", in CVPR, 2012; A. Bissacco, M. Cummins, Y. Netzer, and H. Neven, "PhotoOCR: Reading Text in Uncontrolled Conditions", in ICCV, 2013; L. Neumann and J. Matas, "Scene Text Localization and Recognition with Oriented Stroke Detection", in ICCV, 2013; and C. Yao, X. Bai, B. Shi, and W. Liu, "Strokelets: A Learned Multi-Scale Representation For Scene-Text Recognition", in CVPR, 2014, as recent examples. However, these methods focus only on recognition and do not produce image signatures. Therefore, these models cannot be easily used for retrieval with image or text queries, which is a requirement for some applications, such as license plate matching.

Other previous work relates to the use of mid-level features, where "blocks" containing some basic semantic information are discovered/learned/defined. See Y.-L. Boureau, F. Bach, Y. LeCun, and J. Ponce, "Learning mid-level features for recognition", in CVPR, 2010; M. Juneja, A. Vedaldi, C. Jawahar, and A. Zisserman, "Blocks that shout: Distinctive parts for scene classification", in CVPR, 2013; and C. Yao, X. Bai, B. Shi, and W. Liu, "Strokelets: A Learned Multi-Scale Representation For Scene-Text Recognition", in CVPR, 2014. The use of mid-level features has been shown to produce large improvements in different tasks. Of those works, the most related to this disclosure is the work of C. Yao, X. Bai, B. Shi, and W. Liu, "Strokelets: A Learned Multi-Scale Representation For Scene-Text Recognition", in CVPR, 2014, which learns Strokelets, a mid-level representation that can be understood as "parts" of characters. These are then used to represent characters in a more semantic way. The main distinctions between this previous use of mid-level features and this disclosure are: i) exploitation of supervised information is used to learn a more semantic representation according to this disclosure, and ii) explicit classification of character blocks is not used, and instead use of a semantic representation is used to construct a high-level word image signature according to this disclosure.

The embedding approaches of J. A. Rodriguez-Serrano and F. Perronnin, "Label embedding for text recognition", in BMVC, 2013 and J. Almazán, A. Gordo, A. Fornés, and E. Valveny, "Handwritten word spotting with corrected attributes", in ICCV, 2013 could also be understood as producing supervised mid-level features, but do not use character bounding box information to do so. To learn the semantic space, supervised dimensionality reduction of local Fisher vectors is performed and the Fisher vectors are then encoded and aggregated into a global Fisher vector. This could be understood as a deep Fisher network for image recognition. See K. Simonyan, A. Vedaldi, and A. Zisserman, "Deep fisher networks for large-scale image classification", in NIPS, 2013. A main difference is that the goal of K. Simonyan, A. Vedaldi, and A. Zisserman, "Deep fisher networks for large-scale image classification", in NIPS, 2013 is to produce an extra layer on the Fisher representation, similar in spirit to deep networks; the supervised dimensionality step is learned using the image labels, the same labels that will be used for the final classification step. According to the disclosed method and system, the goal is to transfer knowledge from information that is only available on an external training dataset, i.e., the character bounding boxes, to produce features that are correlated with characters, and exploit this information from the target datasets.

INCORPORATION BY REFERENCE

U.S. Pat. No. 6,249,604, by Huttenlocher et al., issued Jun. 19, 2001, and entitled "Method for Determining Boundaries of Words in Text";

U.S. Pat. No. 5,687,253, by Huttenlocher et al., issued Nov. 11, 1997, and entitled "Method for Comparing Word Shapes";

U.S. Pat. No. 5,640,466, by Huttenlocher et al., issued Jun. 17, 1997, and entitled "Method of Deriving Wordshapes for Subsequent Comparison";

U.S. Pat. No. 5,557,689, by Huttenlocher et al., issued Sep. 17, 1996, and entitled "Optical Word Recognition by Examination of Word Shape";

U.S. Pat. No. 5,539,841, by Huttenlocher et al., issued Jul. 23, 1996, and entitled "Methods for Comparing Image Sections to Determine Similarity Therebetween";

U.S. Pat. No. 5,410,611, by Huttenlocher et al., issued Apr. 25, 1995, and entitled "Method for Identifying Word Bounding Boxes in Text";

U.S. Pat. No. 5,321,770, by Huttenlocher et al., issued Jun. 14, 1994, and entitled "Method for Determining Boundaries of Words in Text";

U.S. Patent Publication No. 2014/0291563, by Rodriguez-Serrano et al., published Aug. 7, 2014 and entitled "Label-Embedding For Text Recognition";

D. Aldavert, M. Rusiñol, R. Toledo and J. Lladós, "Integrating Visual and Textual Cues for Query-by-String Word Spotting", in ICDAR, 2013;

J. Almazán, A. Gordo, A. Fornés, and E. Valveny, "Efficient exemplar word spotting", in BMVC, 2012;

J. Almazán, A. Gordo, A. Fornés, and E. Valveny, "Handwritten word spotting with corrected attributes", in ICCV, 2013;

J. Almazán, A. Gordo, A. Fornés, and E. Valveny, "Word spotting and recognition with embedded attributes", Technical report, 2014;

A. Bissacco, M. Cummins, Y. Netzer, and H. Neven, "PhotoOCR: Reading Text in Uncontrolled Conditions", in ICCV, 2013;

Y.-L. Boureau, F. Bach, Y. LeCun, and J. Ponce, "Learning mid-level features for recognition", in CVPR, 2010;

G. Csurka, C. R. Dance, L. Fan, J. Willamowski, and C. Bray, "Visual Categorization with Bags of Keypoints", in ECCV Workshop on Statistical Learning in Computer Vision, 2004;

V. Goel, A. Mishra, K. Alahari, and C. V. Jawahar, "Whole is greater than sum of parts: Recognizing scene text words", in ICDAR, 2013;

Y. Gong, Q. Ke, M. Isard, and S. Lazebnik, "A multi-view embedding space for modeling internet images, tags, and their semantics", IJCV, 2013;

H. Hotelling, "Relations between two sets of variables", Biometrika, 1936;

H. Jégou and O. Chum, "Negative evidences and co-occurrences in image retrieval: the benefit of PCA and whitening", in ECCV, 2012;

M. Juneja, A. Vedaldi, C. Jawahar, and A. Zisserman, "Blocks that shout: Distinctive parts for scene classification", in CVPR, 2013;

D. Karatzas, S. R. Mestre, J. Mas, F. Nourbakhsh, and P. P. Roy. "ICDAR 2011 Robust Reading Competition-Challenge 1: Reading Text in Born-Digital Images", in ICDAR, 2011;

D. Kumar, M. A. Prasad, and A. Ramakrishnan, "Benchmarking recognition results on camera captured word image datasets", in Document Analysis and Recognition, 2012;

S. Lucas, A. Panaretos, L. Sosa, A. Tang, S. Wong, and R. Young, "ICDAR 2003 Robust Reading Competition", in ICDAR, 2003;

A. Mishra, K. Alahari, and C. V. Jawahar, "Scene text recognition using higher order language priors", in BMVC, 2012;

A. Mishra, K. Alahari, and C. V. Jawahar, "Top-down and bottom-up cues for scene text recognition", in CVPR, 2012;

L. Neumann and J. Matas, "Scene Text Localization and Recognition with Oriented Stroke Detection", in ICCV, 2013;

F. Perronnin and C. R. Dance, "Fisher Kernels on Visual Vocabularies for Image Categorization", in CVPR, 2007;

F. Perronnin, Y. Liu, J. Sánchez, and H. Poirier, "Large-scale image retrieval with compressed fisher vectors", in CVPR, 2010;

F. Perronnin and J. A. Rodriguez-Serrano, "Fisher kernels for handwritten word-spotting", in ICDAR, 2009;

F. Perronnin, J. Sánchez, and T. Mensink, "Improving the Fisher kernel for large-scale image classification", in ECCV, 2010;

J. A. Rodriguez-Serrano and F. Perronnin, "Label embedding for text recognition", in BMVC, 2013;

M. Rusiñol, D. Aldavert, R. Toledo, and J. Lladós, "Browsing heterogeneous document collections by a segmentation-free word spotting method", in ICDAR, 2011;

A. Shahab, F. Shafait, and A. Dengel, "ICDAR 2011 Robust Reading Competition-Challenge 2: Reading Text in Scene Images", in ICDAR, 2011;

V. Sharmanska, N. Quadrianto, and C. Lampert, "Learning to Rank Using Privileged Information", in ICCV, 2013;

K. Simonyan, A. Vedaldi, and A. Zisserman, "Deep fisher networks for large-scale image classification", in NIPS, 2013;

V. Vapnik and A. Vashist, "A New Learning Paradigm: Learning Using Privileged Information", Neural Networks, 2009;

K. Wang, B. Babenko, and S. Belongie, "End-to-end Scene Text Recognition", in ICCV, 2011;

J. Weinman and A. H. E. Learned-Milles, "Scene Text Recognition Using Similarity and a Lexicon with Sparse Belief Propagation", TPAMI, 2009;

C. Yao, X. Bai, B. Shi, and W. Liu, "Strokelets: A Learned Multi-Scale Representation for Scene-Text Recognition", in CVPR, 2014, are incorporated herein by reference in their entirety.

BRIEF DESCRIPTION

In one embodiment of this disclosure, described is a computer-implemented method for generating a visual feature to semantic space transformation map using a set of text images, each text image including one or more annotated character bounding boxes, the method comprising: a) extracting a plurality of image patch descriptors representative of a plurality of respective image patches representative of the text images, the plurality of image patches including a background and a foreground area associated with the text images; b) computing a plurality of aggregated representations of the image patch descriptors, each aggregated representation associated with an image block including two or more image patches; c) computing character annotations associated with each image block by measuring a proximate relationship of an image block with an annotated character bounding box; and d) generating the visual feature to semantic space transformation map by constructing an intermediate subspace which maps the aggregated representations associated with the image blocks computed in step b) to the character annotations associated with each image block computer in step c).

In another embodiment of this disclosure, described is a system for generating a visual feature to semantic space transformation map using a set of text images, the text image including one or more annotated character bounding boxes, the system comprising: a descriptor extractor which extracts a plurality of image patch descriptors representative of a plurality of respective image patches representative of the text images, the plurality of image patches including a background and a foreground area associated with the text image; an aggregator which computes a plurality of aggregated representations of the image patch descriptors, each aggregated representation associated with an image block including two or more image patches; character annotator which computes character annotations associated with each image block by measuring a proximate relationship of an image block with an annotated character bounding box; a visual feature to semantic space transformation map generator which generates the transformation map by constructing an intermediate subspace which maps the aggregated representation associated with the image blocks computer to the character annotations associated with each image block; and a processor which implements the descriptor extractor, the aggregator, the character annotator and the visual feature to semantic space transformation map generator.

In yet another embodiment of this disclosure, described is a computer-implemented method for generating a global image representation of a text image, the method comprising: a) extracting a plurality of image patch descriptors representative of a plurality of respective image patches representative of the text image, the plurality of image patches including a background area and a foreground area associated with the text image; b) computing a plurality of aggregated representations of the image patch descriptors, each aggregated representation associated with an image block including two or more image patches; c) determining character annotations associated with each image block by projecting each image block's aggregated representation computer in step b) into an intermediate subspace associated with training text images including one or more annotated character bounding boxes, the intermediate subspace mapping visual features to a semantic space; and d) associating the determined character annotation with each respective image block associated with the text image to generate the global image representation of the text image.

In yet still another embodiment of this disclosure, described is a system for generating a global image representation of a text image the system comprising: a descriptor extractor which extracts a plurality of respective image patches representative of the text image, the plurality of image patches including a background area and a foreground area associated with the text image; an aggregator which computes a plurality of aggregated representations of the image patch descriptors, each aggregated representation associated with an image block including two or more image patches; a character annotator which determines character annotations associated with each image block's aggregated representation into an intermediate subspace associated with training test images, the intermediate subspace mapping aggregated representations associated with training text image blocks to respective character annotations associated with each training text image block; and a global image representation generator which associates the determined character annotations with each respective image block associated with the text image to generate the global image representation of the text image.

BRIEF DESCRIPTION OF THE DRAWINGS

FIG. 1 (Bottom) is an exemplary embodiment of a global image representation method/system according to this disclosure.

DETAILED DESCRIPTION

This disclosure addresses problems associated with text recognition where a word image is given and the goal is to output its label. AS briefly discussed in the background, there are two predominant approaches to solving this problem: (i) OCR (Optical Character Recognition)-based approaches that involve recognizing individual characters and (ii) retrieval-based approaches that involve computing an image descriptor and finding a closest text match. The disclosed approach bridges the gap between these two approaches where it does not involve recognizing characters, as is the case of (i), however, it leverages character bounding box annotations at training time. The disclosed approach, and exemplary embodiments provided herein, involve extracting relatively more semantic local descriptors by aggregating locally, statistics of small patches and correlating them with character bounding box annotations. The fact that the disclosed approach does not require explicit character recognition makes it relatively fast. Compared to standard part-based models, the disclosed approach does not require explicitly recognizing and combining parts, which provides a significant computational advantage.

Figure 1:
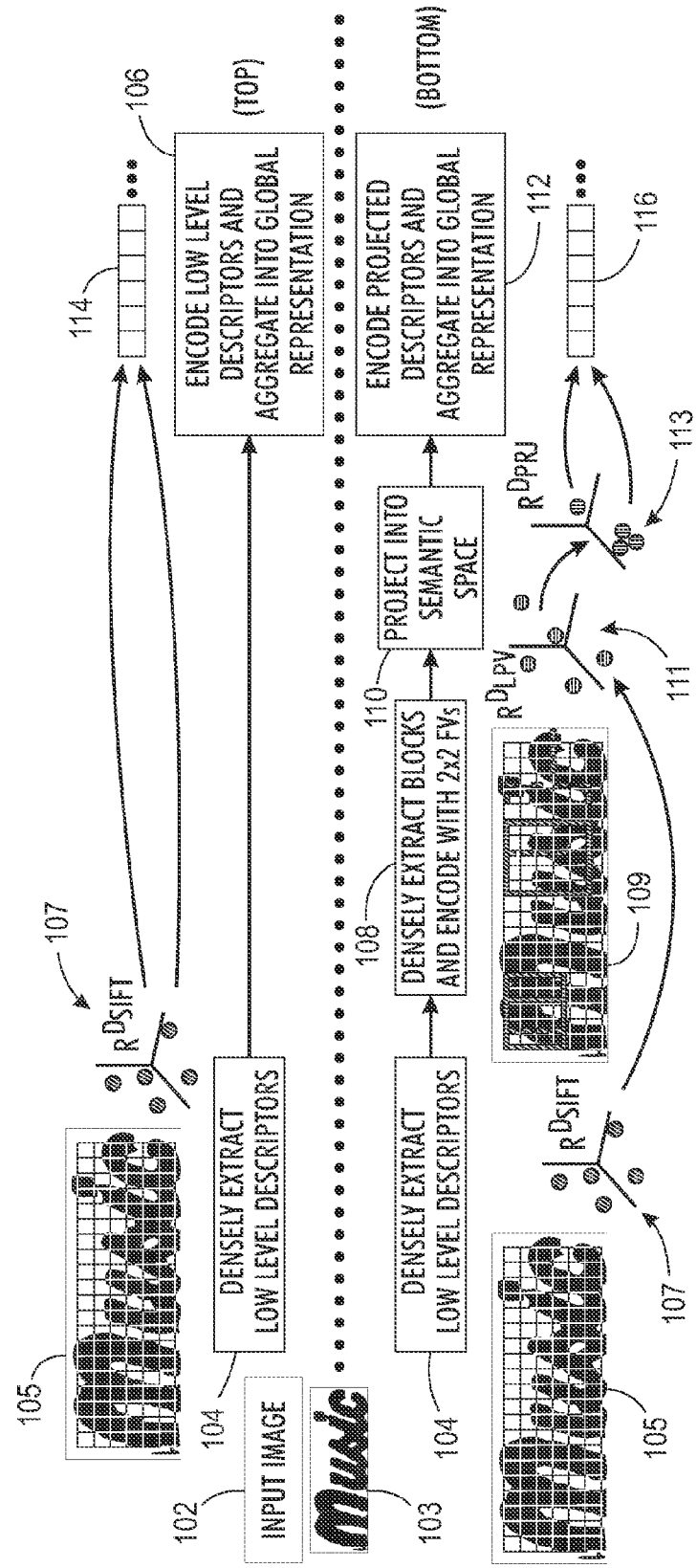
FIG. 1 (Top) is a typical prior encoding flow, in which low-level descriptors, e.g., SIFT, are first densely extracted and then aggregated into a global representation, e.g., FV in this case, which can be used by learning methods that require a global image representation.

As shown in FIG. 1 (top), a typical approach to constructing a global word image representation is to i) extract low-level descriptors 104, ii) encode the descriptors 106, and iii) aggregate into a global representation 106, potentially with spatial pyramids to add some weak geometry. This global word image representation can then be used as an input for different learning approaches. For example, see M. Rusiñol, D. Aldavert, R. Toledo, and J. Lladós, "Browsing heterogeneous document collections by a segmentation-free word spotting method", in ICDAR, 2011; J. Almazán, A. Gordo, A. Fornés, and E. Valveny, "Handwritten word spotting with corrected attributes", in ICCV, 2013; J. A. Rodriguez-Serrano and F. Perronnin, "Label embedding for text recognition", in BMVC, 2013.

The disclosed global image representation method and system provides the construction of global representations based on semantic mid-level features instead of using low-level descriptors directly, as shown in FIG. 1. The objective is to produce features that are very correlated with particular characters, even if the features do not directly translate into particular characters. This is achieved, not by finding and classifying characteristic blocks as done in C. Yao, X. Bai, B. Shi, and W. Liu, "Strokelets: A Learned Multi-Scale Representation For Scene-Text Recognition", in CVPR, 2014, but by projecting all possible image blocks into a lower-dimensional space that is correlated with the characters with which such blocks tend to overlap. By projecting all possible blocks in an image, a set of semantic descriptors is obtained that can subsequently be aggregated into a global image representation, as illustrated in FIG. 1 (bottom).

As shown in FIG. 1 (bottom), first, low-level descriptors are densely extracted 100. Then, blocks of different sizes are densely extracted 108, and each block is represented by aggregating the low-level descriptors it contains into a local FV with a 2×2 spatial pyramid 108. These local FV representations are then projected into a mid-level space correlated with characters 110. Finally, these mid-level features are aggregated into a global FV 112.

Figure 2:
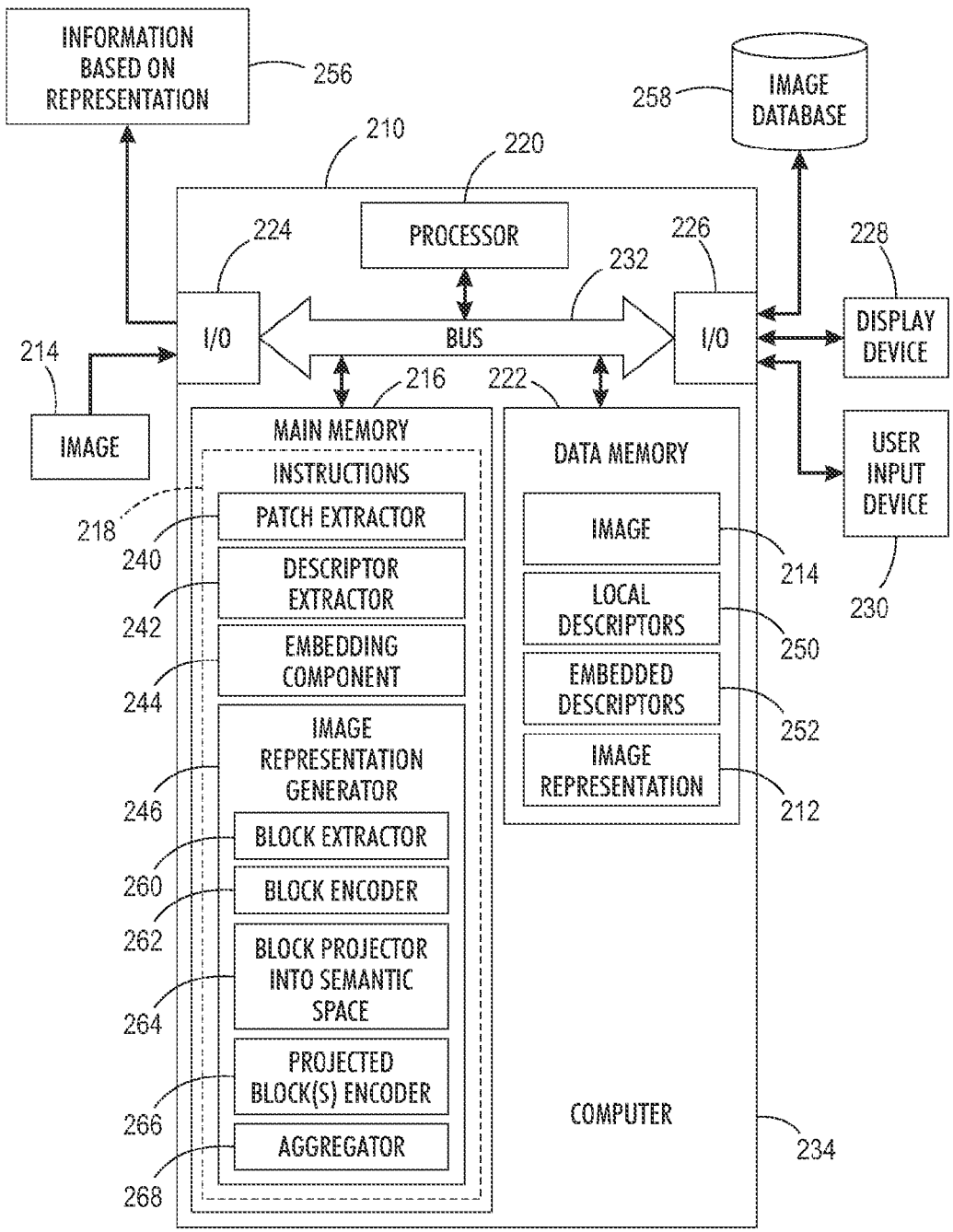
FIG. 2 is a functional block diagram of an image processing system according to an exemplary embodiment of this disclosure.

With reference to FIG. 2, illustrated is an image processing system 210 for generating a global image representation 212 of an input image 214, such as a photographic image, video image, or image file, according to an exemplary embodiment of this disclosure. The system receives as input an image 214 for which a statistical representation 212, such as a fixed length vector associated with a global image representation, is desired.

The illustrated system includes main memory 216 which stores instructions 218 for generating the global image representation and a processor 220, in communication with the memory, for executing the instructions. Data memory 222 stores the input image 214 during processing as well as information generated during the processing of the image. One or more network interface (I/O) devices 224, 226 allow the system to communicate with external devices, such as a source of the image (not shown), a display device 228, such as a computer monitor or LCD screen, and a user input device 230, such as a keyboard, keypad, touch screen cursor control device, or combination thereof. Hardware components of the system may be communicatively connected by a data/control bus 232. The system may be hosted by one or more computing devices 234.

The illustrated instructions include a patch extractor 240, a descriptor extractor 242, an embedding component 244, and an image representation generator 246. Briefly, the patch extractor 240 extracts a set of patches from the image, e.g., patch comprising a set of pixels. The descriptor extractor 242 generates a patch descriptor 250 based on the pixels of the respective patch. The embedding component 244 embeds the patch descriptor into an embedding space using an embedding function, generating an embedded descriptor 252 for each patch. The image representation generator 246 includes a block extractor 260, a block encoder 262, block projector into semantic space 264, projected block encoder 266 and aggregator 268 which aggregates the embedded descriptors 252 to form an aggregation which can serve as image representation 212, or be first normalized or otherwise processed to form the image representation 212. The representation employing component uses the representation 212, for example, for classification of the image or for image retrieval.

Information 256 is output by the system, based on the global image representation generated. The information 256 may include the global image representation 212 itself, a classification for the image, a set of similar images retrieved from an associated image database 258, a combination thereof, or the like.

The computer system 210 may include one or more computing devices, such as a PC, such as a desktop, a laptop, palmtop computer, portable digital assistant (PDA), server computer, cellular telephone, tablet computer, pager, combination thereof, or other computing device capable of executing instructions for performing the exemplary method.

The memory 216 may represent any type of non-transitory computer readable medium such as random access memory (RAM), read only memory (ROM), magnetic disk or tape, optical disk, flash memory, or holographic memory. In one embodiment, the memory 216 comprises a combination of random access memory and read only memory. In some embodiments, the processor 212 and memory 214 may be combined in a single chip. Memory 216 stores instructions for performing the exemplary method as well as the processed data 212, 250, 252.

The network interface 224, 226 allows the computer to communicate with other devices via a computer network, such as a local area network (LAN) or wide area network (WAN), or the internet, and may comprise a modulator/demodulator (MODEM) a router, a cable, and and/or Ethernet port.

The digital processor 220 can be variously embodied, such as by a single-core processor, a dual-core processor (or more generally by a multiple-core processor), a digital processor and cooperating math coprocessor, a digital controller, or the like. The digital processor 220, in addition to controlling the operation of the computer 234, executes the instructions 218 stored in memory 216 for performing the exemplary method, outlined in FIGS. 1, 3 and 4.

The term "software," as used herein, is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

As will be appreciated, FIG. 2 is a high level functional block diagram of only a portion of the components which are incorporated into a computer system 210. Since the configuration and operation of programmable computers are well known, they will not be described further.

Figure 3:
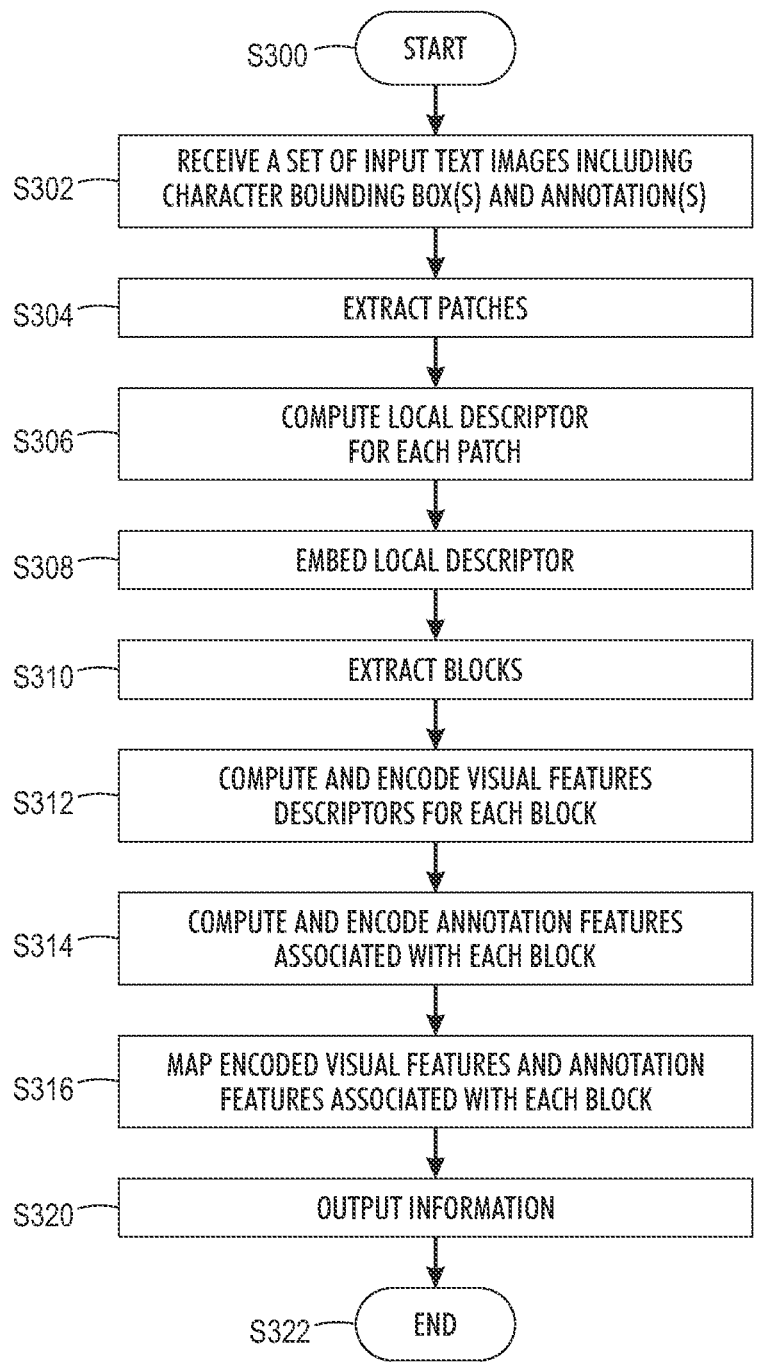
FIG. 3 illustrates a method for constructing a semantic space transformation map using a set of text images including character bounding boxes according to an exemplary embodiment of this disclosure.

FIG. 3 illustrates a method for constructing a semantic space transformation map using a set of text images including character bounding boxes according to an exemplary embodiment of this disclosure. The method begins at S300.

At S302, input image(s) are received by the system, either from an external device, or from internal memory of the computing device 234.

At S304, patches are extracted from the image(s) by the patch extractor 240.

At S306, a patch descriptor is extracted from each patch by the descriptor extractor 242.

At S308, each patch descriptor is embedded using an embedding function to form an embedded patch descriptor.

At S310, blocks are extracted by block extractor 260.

At S312, compute and encode visual features descriptors are computer and encoded for each block by block encoder 262

At S314, annotation features associated with each block are computed and encoded by block projector 264 and block encoder 266.

At S316, encoded visual features and annotation features associated with each block are mapped into semantic space by block projector 264. Further details of this step are discussed below.

At S320, transformation parameters 256 are output. The method ends at S322.

As illustrated in FIG. 3, the learning of a transformation map is completed with the processing of many images. In other words, steps S300 to S314 are performed on a set of text images including character bounding boxes, where steps S300 to S314 yield a visual feature and an annotation feature for each sampled block of every image. Then, learning step S316 generates a transformation map which transforms the visual features to corresponding annotation features. Output step S320 provides the transformation map parameters which are used in other processes, such as S412 of FIG. 4, to transform new input visual features into the semantic space associated with the transformation map.

Figure 4:
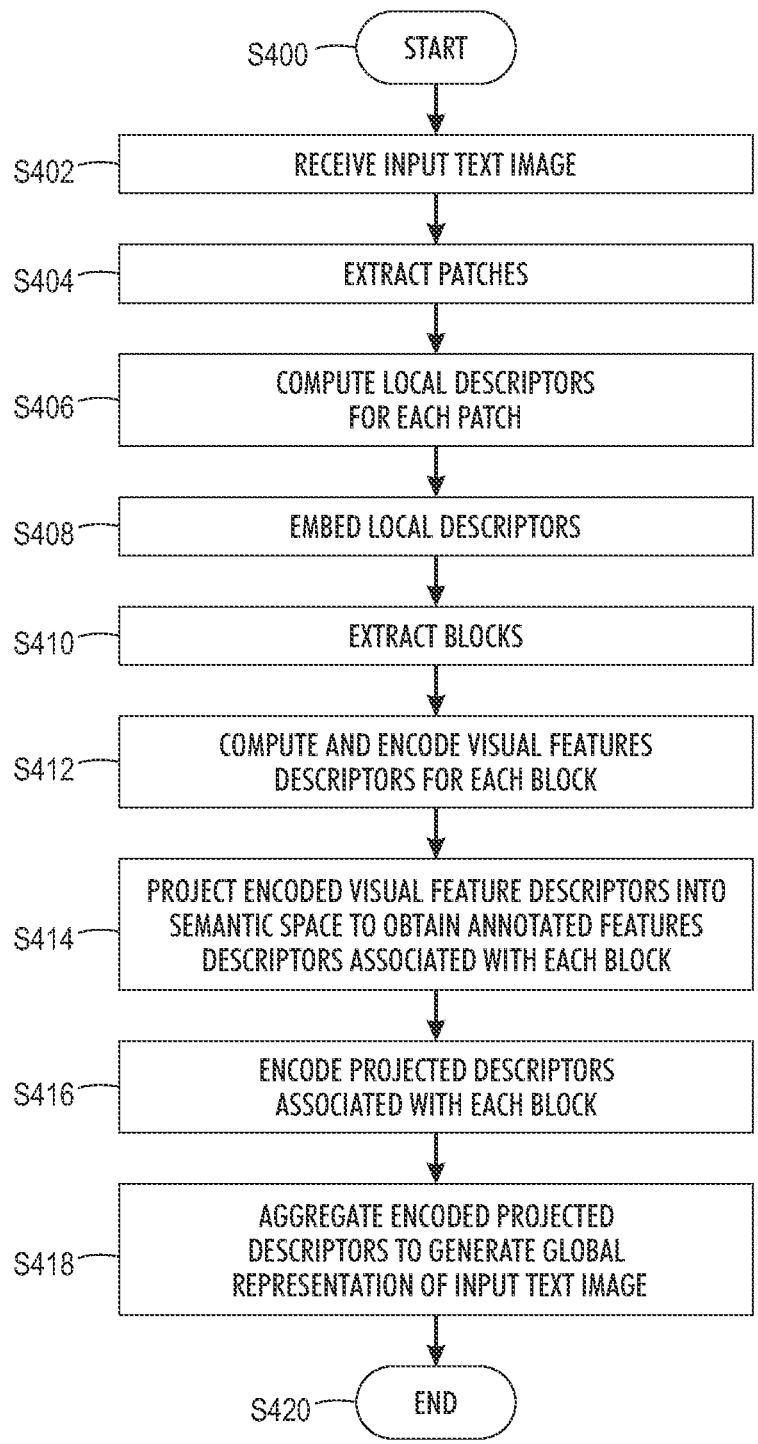
FIG. 4 is a flow chart illustrating a method for generating a global representation of a text image without character bounding boxes according to an exemplary embodiment of this disclosure.

FIG. 4 is a flow chart illustrating a method for generating a global representation of a text image without annotations such as character bounding boxes according to an exemplary embodiment of this disclosure. The method begins at S400.

At S402, an input text image is received by the system, either from an external device, or from internal memory of the computing device 234.

At S404, patches are extracted from each patch by patch extractor 240.

At S406, local descriptors are computed for each patch by descriptor extractor 242.

At S408, local descriptors are embedded by embedding component 244.

At S410, block are extracted by block extractor 260.

At S412, visual features descriptors are computed and encoded for each block by block encoder 262.

At S414, encoded visual feature descriptors are projected into semantic space by block projector 264 to obtain annotated features descriptors associated with each block.

At S416, projected descriptors associated with each block are encoded by projected block encoder 266.

At S418, encoded projected descriptors are aggregated by aggregator 268 to generate global representations of the received text image input.

At S420, the method ends.

Various aspects of the method(s) and system(s) are now described in further detail. Described first is the learning process including the projection of the image blocks into a semantic space correlated with the characters. Then described is the application of the transformation obtained from the learning process to new images in an efficient manner, since extracting and projecting all the blocks of an image independently in a naive manner may be computationally expensive.

Learning Mid-Level Features.

It is assumed for this description, at training time one has access to a training set of N word images and their respective annotations. Let I be one training word image containing |I| characters, and let its annotation be a list of character bounding boxes char_bb and character labels char_y, $C_I = \{(char\_bb_i, char\_y_i), i=1 \ldots |I|\}$. Each character label chary belongs to one of the 62 characters in the alphabet $\Sigma = \{|A|, \ldots, |Z|, |a|, \ldots, |z|, |0|, \ldots, |9|\}$. While the detailed descriptions of an exemplary embodiment provided herein focuses on the use of Latin script, the use of other characters and associated labels, such as, but not limited to, Greek and Cyrillic, and other alphabets/character sets are within the scope of this disclosure.

Denote with block_bb a square block in the training word image represented as a bounding box. For training purposes, randomly sample from every image S blocks of different sizes (e.g., 32×32 pixels, 48×48, etc.) at different positions. Some of these blocks may contain only background, but most of them will contain parts of a character or parts of two consecutive characters that are relevant to be learned.

These blocks are then described using two modalities. The first one is based only on visual features. The second one is based on the character annotations. This second modality is more discriminative but is only available during training. Then, a mapping between the visual features and the character annotation space can be learned. Once this mapping has been learned, at testing time, i.e., runtime, all possible blocks in an image without annotations can be extracted, representing them first with low-level visual features, and then mapping the low-level visual features into a semantic space to obtain mid-level features, as illustrated in FIG. 1 (bottom).

Block Visual Features.

To encode the visual aspect of the blocks, used are Fisher vectors (FV), see F. Perronnin and C. R. Dance, "Fisher Kernels on Visual Vocabularies for Image Categorization", in CVPR, 2007, over SIFT descriptors, with a spatial pyramid of 2×2 to add some basic structure to the block. The descriptors are then $l_2$ normalized. According to an exemplary embodiment, the vectors are not power-normalized, see F. Perronnin, J. Sánchez, and T. Mensink, "Improving the Fisher kernel for large-scale image classification", in ECCV, 2010, since this non-linearity would prevent the efficient aggregation method described below. Fortunately, power normalization is most useful when using large vocabularies, see F. Perronnin, Y. Liu, J. Sánchez, and H. Poirier, "Large-scale image retrieval with compressed fisher vectors", in CVPR, 2010. With small vocabularies, such as 8 Gaussians for the case described herein, the improvements due to power normalization are very limited. Stacking the descriptors of all the sampled blocks of all the training images leads to a matrix X of size $NS \times D_v$, where the dimensionality of these visual representations is denoted with $D_v$.

Block Annotations.

The second view is based on the annotation and contains information about the overlaps between the blocks and the characters in the word image. Specifically, the goal is to encode with which characters the sampled blocks tend to overlap. In particular, encoding what percentage of the characters regions are covered by the blocks. As a first approach, a $D_a$-dimensional label y is constructed for each sampled block, with $D_a = |\Sigma| = 62$. Given a block, its label y is encoded as follows: for each character $\Sigma_d$ in the alphabet $\Sigma$, assigned at position d is the normalized overlap between the bounding box of the block and the bounding boxes of the characters of the word whose label char_$y_i$, equals $\Sigma_d$. Since the word may have repeated characters, the maximum overlap is used:

$$y^d = \max_{(char\_bb_i, char\_y_i) \in C_I} \delta_{i,d} \frac{|\text{Intersection}(block\_bb, char\_bb_i)|}{|char\_bb_i|}, \quad (1)$$

where |•| represents the area of the region, and $\delta_{i,d}$ equals 1 if char_$y_i = \Sigma_d$ and 0 otherwise.

Figure 5:
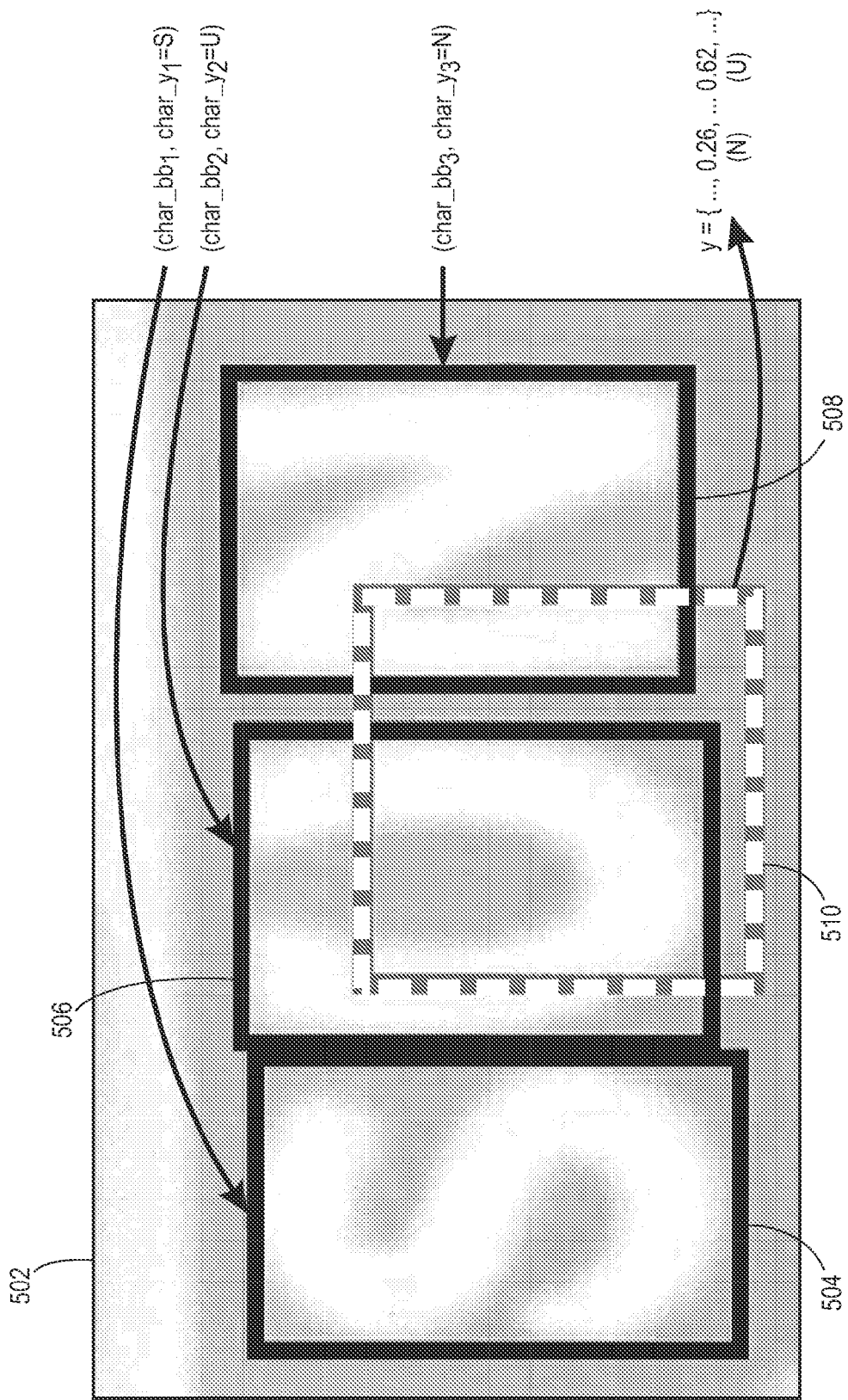
FIG. 5 is an example of an annotated word and a sampled block with its label.

FIG. 5 illustrates an annotated image 502 including character bounding boxes 504, 506 and 508 and a sampled block with its corresponding computed label y. As with the first view, it is possible to encode all the block labels of all the sampled blocks of all the training images in a matrix $Y \in R^{NS \times D_a}$. The characters of the word contain bounding boxes (in red) and label annotations ('S', 'U', 'N'). The image also shows a sampled block in green with its respective computed label. All the elements of are set to 0 except the ones corresponding to the 'U' and 'N' characters.

Refinement.

The labels described present a shortcoming: although they correlate blocks with characters, they do not encode which part of the character they are correlated with, which can be important, since this type of information can have great discriminative power. To address this problem, the ground-truth bounding box character annotations can be split in R×R regions. A 1×1 region (i.e, the whole character) can be considered, but also 2×2 regions, 4×4 regions, etc. Then, the labels ŷ now encode the overlap of the block with each region of the character independently, leading to a label of size $R^{R^2 \times D_a}$:

$$\hat{y}^{d,r} = \max_{(char\_bb_i, char\_y_i) \in C_I} \delta_{i,d} \frac{|\text{Intersection}(block\_bb, char\_bb_{i,r})|}{|char\_bb_{i,r}|}, \quad (2)$$

with $r = 1 \ldots R^2$, and where char_$bb_{i,r}$ denotes the r-th region of bounding box char_$bb_i$. This label is flattened into $R^{R^2 D_a}$ dimensions. Furthermore, computing labels at different character levels and concatenating the results in a final label before learning the projection can also be performed.

Learning the Mid-Level Space.

To determine a mapping between X and Y, Canonical Correlation Analysis (CCA) is performed according to an exemplary embodiment. See H. Hotelling, "Relations between two sets of variables", Biometrika, 1936. While the exemplary embodiment described herein focuses on the use of CCA, other mapping/construction techniques may be used, including but not limited to, Ridge Regression, Neural Networks, etc.

CCA determines two projection matrices $U \in R^{D_v \times K}$ and $V \in R^{D_a \times K}$ such that their correlation in the projected space is maximized. To determine U, a generalized eigenvalue problem is solved. When $D_v$ and $D_a$ are small, as in the case described herein, this is relatively fast and needs to be solved only once, offline. The K leading eigenvectors of the solution form the columns of matrix U, and the output dimensionality K is chosen by keeping only a certain number of eigenvectors. Analogously, a related eigenvalue problem can be solved to find V. However, it is not used here where there is no access to character bounding boxes during testing, i.e., processing new text images without character bounding boxes. This process allows the learning of a matrix U that projects X into a subspace of K dimensions that is correlated with the labels Y. This is depicted in Algorithm 1 shown below.

---

Algorithm 1  Learn embedding

---

Input: Training images $\mathcal{I} = \{\mathcal{I}_1, \ldots \mathcal{I}_N\}$ and their annotations.
Input: Output dimensionality K. Number of sampled blocks per image S.
Output: Embedding matrix U.
  for $\mathcal{I} \in \mathcal{I}$ do
    Densely extract SIFT descriptors.
    Sample S blocks.
    for each block do
      i) Aggregate the SIFT descriptors inside the block bounding box
      into a FV with a 2 × 2 spatial pyramid. Add as a new row of X.
      ii) Construct label of block using Equation (1) or Equation (2).
      Add as a new row of Y.
Compute U using CCA. The k-th column of U is the eigenvector solution
of the generalized eigenvalue problem $X^T Y(Y^T Y)^{-1} Y^T X u_k = \lambda (X^T X) u_k$
associated with the k-th largest eigenvalue.
End

---

In the described system, the block labels encode the percentage of the characters or the characters' regions covered by the blocks. However, this is only one possible way to compute the labels. Other options include, e.g., encoding which percentage of the block is covered, or working at the pixel level instead of the region level. Any representation that relates the visual block with the character annotation could be considered.

Efficient Word Representation.

Once the matrix U has been learned, this knowledge can be used to compute the mid-level features of a new image. The process is as follows: i) Using a given stepsize, e.g., 4 pixels, extract all possible blocks at all sizes using parameters used during the offline learning step. This leads to tens of thousands of overlapping blocks per image. ii) For each block, extract SIFT descriptors, compute a FV with a 2×2 spatial pyramid, and $l_2$ normalize. iii) Project the FVs with U, and $l_2$ normalize again. Notably, $l_2$ normalization after PCA/CCA can improve the results since it accounts for the missing energy in the dimensionality reduction step. See H. Jégou and O. Chum, "Negative evidences and co-occurrences in image retrieval: the benefit of PCA and whitening", ECCV, 2012.

The process of densely extracting all possible blocks of an image may not be feasible in practice due to limited computational resources, as it could take a long time to compute and project all the FVs for all the blocks independently in a naive way. To address this issue, provided herein is an approach to compute these descriptors exactly in an efficient manner. The key idea is to isolate the contribution of each individual SIFT feature towards the mid-level feature of a block that included such a SIFT feature. If that contribution is linear, the individual contribution of each SIFT feature in the image can be computed and accumulated in an integral representation. Then, the mid-level representation of an arbitrary block can be computed with just 2 additions and 2 subtractions over vectors, and computing all possible descriptors of all possible blocks becomes feasible and efficient. At first sight the contribution of the features is not linear due to two reasons: the spatial pyramid, and the $l_2$ normalization of the FVs before the projection with U. Fortunately, both problems can be overcome. The disclosed approach works due to three key properties:

1) The FV is additive when not performing any normalization, given a set of descriptors $$S, fv(S) = \frac{1}{|S|} \sum_{s \in S} fv(s),$$

since the FV aggregates the encoded descriptors using average pooling. This is key since it implies that FVs can be computed independently and then aggregated. This is also true if the descriptors are projected linearly, i.e $$U^T fv(S) = \frac{1}{|S|} \sum_{s \in S} U^T fv(s).$$

However, it is not true if the FVs are $l_2$ normalized, i.e., $$fv(S)/\|fv(S)\|_2 \neq \frac{1}{|S|} \sum_{s \in S} fv(s)/\|fv(s)\|_2.$$

Fortunately, $l_2$ normalizing the FVs is not necessary, cf next property.

2) The normalization of the FV is absorbed by the normalization after the projection with U. If f is an unnormalized FV and $f_2$ is the $l_2$ normalized version, then $U^T f_2 / \|U^T f_2\|_2 = U^T f / \|U^T f\|_2$. Even if the FVs are $l_2$ normalized when learning the projection with CCA (since $l_2$ normalization greatly increases its discriminative power), it is not necessary to $l_2$ normalize them when representing the words if they are also going to be normalized after projection, which makes the aggregation of FVs seen on property one possible. Notably the $$\frac{1}{|S|}$$

factor is also absorved by the $l_2$ normalization.

3) The projection of a FV with spatial pyramid is also additive. Projecting a FV f with spatial pyramid with U is equivalent to projecting each spatial region independently with the corresponding rows of U and then aggregating the results. Assuming spatial pyramids of 2×2, it is also possible to rearrange U into $$\hat{U} \in R^{\frac{D_V}{4} \times 4K}.$$

In this case, projecting a FV without spatial pyramid with $\hat{U}$ leads to a descriptor of 4K dimensions. Each group of K dimensions represents the results of projecting f assuming that it was representing one of the 4 spatial quadrants of a larger block.

Figure 6:
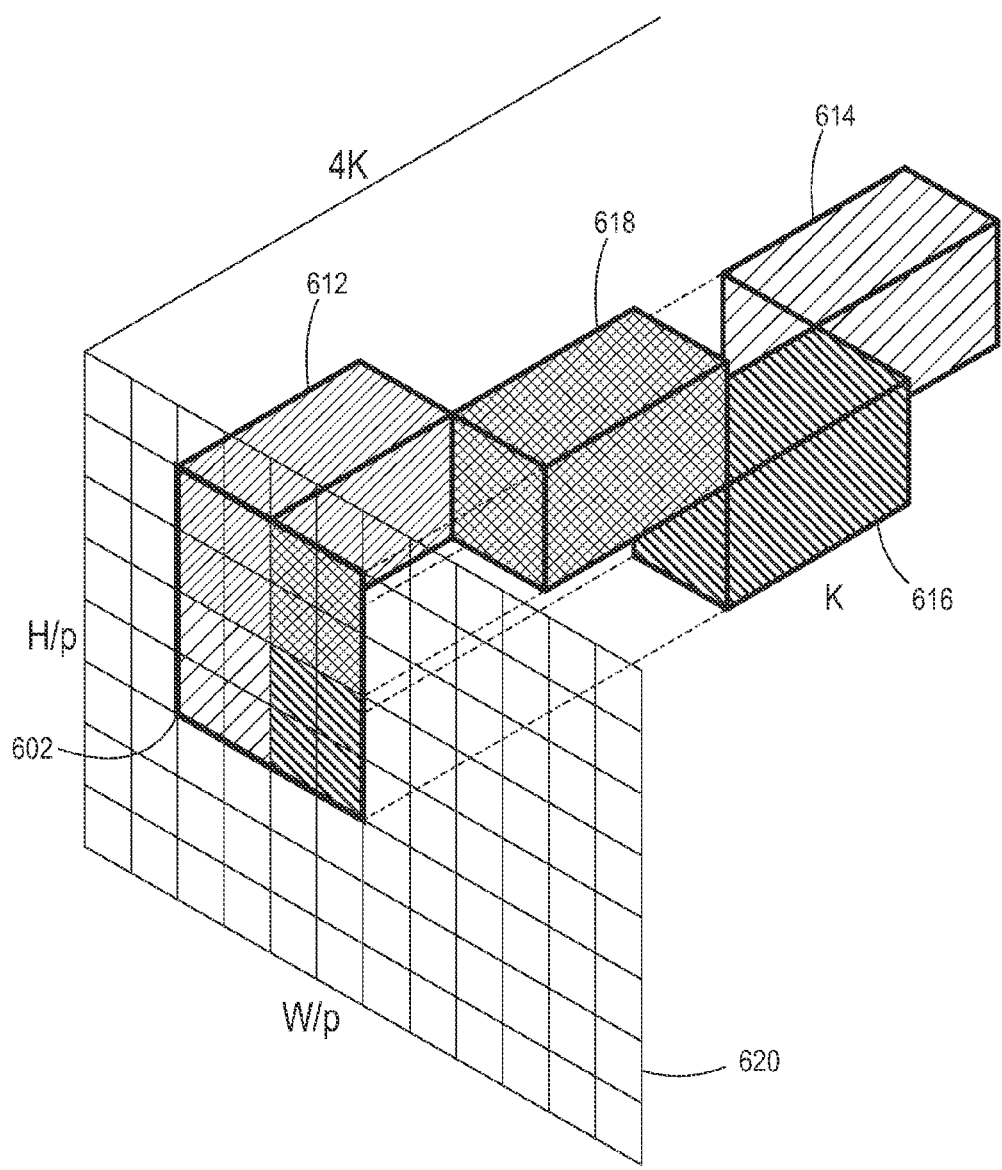
FIG. 6 is a grid $\mathcal{G}$ representing the influence of each descriptor in an image towards the mid-level features according to an exemplary embodiment of this disclosure.

By exploiting these properties, the mid-level descriptors of all possible blocks in an image can be computed in an efficient manner. According to one exemplary approach, the process begins by dividing the target image in contiguous, non-overlapping cells of p×p pixels, where p controls the step size between two consecutive blocks. During experiments, setting p=4, the process computes a FV in each of these regions with neither spatial pyramids nor $l_2$ normalization and projects them with $\hat{U}$ into a space of 4K dimensions. This leads to a grid 620 representation of the image $$G \in R^{\frac{H}{p} \times \frac{W}{p} \times 4K},$$

where H and W are the height and the width of the image. The "depth" of the representation can be separated into 4 groups, i.e., cuboids 612, 614, 616, and 618, that represent the projection of a particular grid cell depending on its position on the pyramid 602, as illustrated in FIG. 6. Note that, since the cells do not overlap, computing the FVs of all those cells has approximately the same cost as computing one single FV using the descriptors of all the image, and does not involve any particular extra cost. Keeping in memory $$\frac{H}{p} \times \frac{W}{p} \times 4K$$

elements at the same time is also not an issue. Finally, computed is an integral representation over the height and the width, i.e, $\hat{G}_{i,j,k} = \Sigma_{1 \le a \le i, 1 \le b \le j} G_{a,b,k}$.

At this point, the descriptor of any given block can be computed by i) separating the block in 4 different spatial regions; ii) computing the descriptor of each region independently with two sums and two subtractions on vectors of dimension K by accessing the corresponding rows and columns of the integral representation $\hat{G}$, and by keeping only the group of K dimensions corresponding to the particular spatial regions; iii) aggregating the descriptors of each spatial region, and iv) $l_2$ normalizing the final result. During an experimental setup, using images of approximately 100 pixels in height and a step size p of 4 pixels, extracted and described were all blocks of an image at 6 different block sizes in less than 3 seconds using a MATLAB implementation on a single core.

Figure 7:
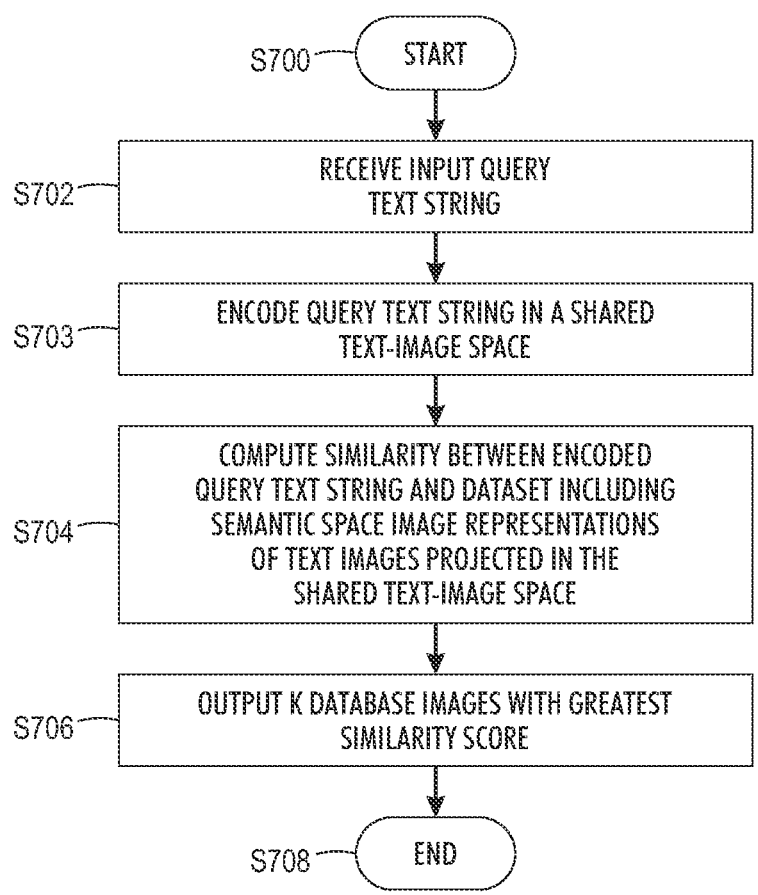
FIG. 7 is a flow chart illustrating a method for retrieving a global representation of one or more images including a queried text string according to an exemplary embodiment of this disclosure.

FIG. 7 is a flow chart illustrating a method for retrieving a global representation of one or more images including a queried text string according to an exemplary embodiment of this disclosure. The method begins at S700.

At S702, receive input query text string.

At S703, encode text string in a shared text-image space. See U.S. Patent Publication No. 2014/0291563, by Rodriguez-Serrano et al., published Aug. 7, 2014 and entitled "Label-Embedding For Text Recognition".

At S704, compute similarity between encoded text string and all the images in a dataset using a dot product as a measure of similarity. The image included in the dataset is first represented using the process illustrated in FIG. 4, and then the global image prepresentations are projected in a shared text-image space. See U.S. Patent Publication No. 2014/0291563, by Rodriguez-Serrano et al., published Aug. 7, 2014 and entitled "Label-Embedding For Text Recognition".

At S706, the output provided is K dataset images with the greatest relative similarity score.

At S708, the method ends.

Figure 8:
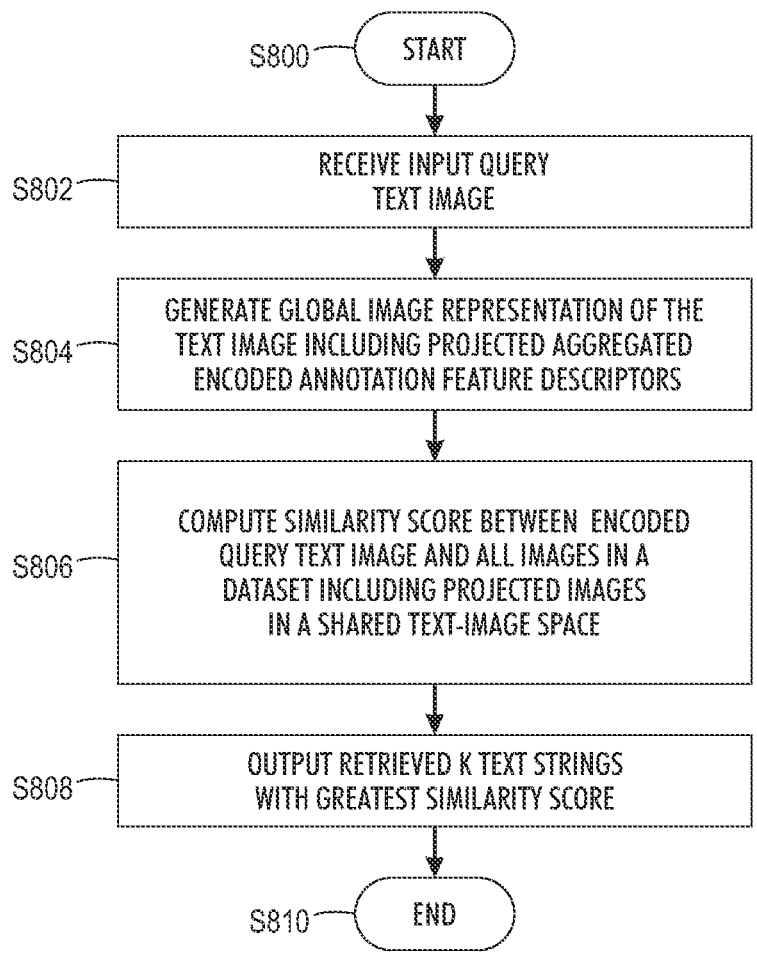
FIG. 8 is a flow chart illustrating a method for retrieving a global representation of one or more images including a queried image including text according to an exemplary embodiment of this disclosure.

FIG. 8 is a flow chart illustrating a method for retrieving a global representation of one or more images including a queried image including text according to an exemplary embodiment of this disclosure. The method begins at S800.

At S802, receive input query text image.

At S804, generate global image representation of a text image including projected aggregated encoded annotation feature descriptors.

At S806, project image representations from S804 into a shared text-image space. See U.S. Patent Publication No. 2014/0291563, by Rodriguez-Serrano et al., published Aug. 7, 2014 and entitled "Label-Embedding For Text Recognition". Then compute similarity score between projected image representations and all text strings encoded in the shared text-image space included in a dataset using a dot product as a measure of similarity.

At S808, the output provided is K text strings with a greatest relative similarity scores.

At S810, the method ends.

Experiments.

Described now are datasets used for learning mid-level features and for purposes of evaluating the disclosed method and system for generating global image representations of text images. Then described are the evaluation protocols and results of one experiment.

Datasets.

Learning Dataset.

Learning the transformations described herein requires gathering training words annotated at the character level. See D. Kumar, M. A. Prasad, and A. Ramakrishnan, "Benchmarking recognition results on camera captured word image datasets", in Document Analysis and Recognition, 2012. ICDAR 2003 and S. Lucas, A. Panaretos, L. Sosa, A. Tang, S. Wong, and R. Young, "ICDAR 2003 Robust Reading Competition", in ICDAR, 2003, Sign Recognition 2009, see J. Weinman and A. H. E. Learned-Milles, "Scene Text Recognition Using Similarity and a Lexicon with Sparse Belief Propagation", TPAMI, 2009, Street-View Text, see U.S. patent application Ser. No. 14/054,998 by J. Rodriguez-Serrano, F. Perronnin, H. Poirier, F. Roulland, and V. Ciriza, filed Oct. 16, 2013 and entitled "DELAYED VEHICLE IDENTIFICATION FOR PRIVACY ENFORCEMENT", Born-Digital 2011, D. Karatzas, S. R. Mestre, J. Mas, F. Nourbakhsh, and P. P. Roy. "ICDAR 2011 Robust Reading Competition-Challenge 1: Reading Text in Born-Digital Images", in ICDAR, 2011, and ICDAR 2011, see A. Shahab, F. Shafait, and A. Dengel, "ICDAR 2011 Robust Reading Competition-Challenge 2: Reading Text in Scene Images", in ICDAR, 2011, have pixel-level annotations that one can exploit. See http://mile.ee.iisc.ernet.in/bench/. The ground-truth of these datasets contains the word transcription as well as pixel-level annotations that separate foreground for background. However, they do not have character annotations as such. To produce these annotations, used was an automatic heuristic that tries to merge connected components of characters with two components such as "i", "j", "?", or "!". After that, if the number of connected components is equal to the number of characters of the word, character labels are assigned to each component. Otherwise, the word is discarded. In total, automatically gathered where approximately 2,000 annotated words. Of these datasets, kept were only ICDAR 2003, ICDAR 2011, and Sign Recognition 2009. Discarded was Born-Digital since it comes from a very different domain. Also discarded was Street-View text, since it is precisely one of the target datasets used, and one of the goals is to learn features that can adapt to unseen datasets.

Evaluation Datasets.

The approach was evaluated on two public benchmarks: IIIT5K, see A. Mishra, K. Alahari, and C. V. Jawahar, "Scene text recognition using higher order language priors", in BMVC, 2012, and Street-View Text (SVT), see U.S. patent application Ser. No. 14/054,998 by J. Rodriguez-Serrano, F. Perronnin, H. Poirier, F. Roulland, and V. Ciriza, filed Oct. 16, 2013 and entitled "DELAYED VEHICLE IDENTIFICATION FOR PRIVACY ENFORCEMENT". IIIT5K is the largest public annotated scene-text dataset known to date, with 5,000 cropped word images: 2,000 training words and 3,000 testing words. Each testing word is associated with 3 lexicons used in recognition tasks: a small lexicon of 50 words, a medium lexicon of 1,000 words, and a (rarely used) large lexicon of more than 500,000 words. SVT is another popular dataset with about 350 images harvested from Google Street View™. These images contain annotations of 904 cropped words: 257 for training purposes and 647 for testing purposes. Each testing image has an associated lexicon of 50 words. It was also ensured that no testing image of IIIT5K or SVT appears in the learning set.

Implementation Details.

To construct block FVs, extracted were SIFTs at 6 different scales, projecting them with PCA down to 64 dimensions, and aggregating them using FVs (gradients w.r.t. means and variances) with 8 Gaussians and a spatial pyramid of 2×2, leading to a dimensionality $D_v$, of 2×4×64×8=4,096. During training, 150 blocks per training image were sampled.

To construct a global representation, the process extracted all mid-level blocks using K=62 in the CCA projection step. Then, appended were the x and y coordinates of the center of the block, and aggregation was performed using a global FV with a spatial pyramid of 2×6 with 16 Gaussians, leading to 24,576 dimensions. These Fisher vectors are then power- and $l_2$-normalized, see F. Perronnin, J. Sánchez, and T. Mensink, "Improving the Fisher kernel for large-scale image classification", in ECCV, 2010, and can be compared using the dot-product as a similarity measure. To construct the baseline global representation based only on SIFT (with no mid-level features) a very similar approach was followed, but instead of computing the mid-level blocks and reducing their dimensionality down to 62 dimensions with CCA, the SIFT features were used directly, reducing their dimensionality down to 62 dimensions with PCA. This mimics the setup of J. Almazán, A. Gordo, A. Fornés, and E. Valveny, "Word spotting and recognition with embedded attributes", Technical report, 2014. In addition, experiments were performed to reduce the dimensionality of our mid-level features in an unsupervised manner with PCA instead of CCA, to separate the influence of the extra layer of the architecture from the supervised learning.

Evaluation.

Evaluation of the disclosed approach was performed with two different setups. The first one, presents observations srelated to the effect of using supervised and unsupervised mid-level features instead of SIFT descriptors directly when computing the image representations, without applying any further learning, using the dot-product between the global FV representations as a similarity measure. In this case, computed are Fisher vectors using a) SIFT features, b) unsupervised mid-level features (i.e., dimensionality reduction of the block FVs with PCA), and c) supervised mid-level features (i.e., dimensionality reduction with CCA). In this last case, also explored are the effects of the number of character regions used to compute the labels during training (see Equation (2)), SP1 for a 1×1 region, SP2 for a 2×2 region, SP4 for a 4×4 regions, and SP1+SP2+SP4 for the contatenation of those.

Without applying any further learning, measured is the accuracy in a query by example retrieval framework, where a word image is used as a query, and the goal is to retrieve all the images of the same word in the dataset. The use of each image of the test set is in a leave-one-out fashion to retrieve all the other images in the test set. Images that do not have any relevant item in the dataset are not considered as queries.

Results are reported in Table 1 below using both mean average precision and precision at one as metrics. Highlighted are three aspects of the results. First, using supervised mid-level features significantly improves over using SIFT features directly, showing that the representation encodes more semantic information. Second, the improvement in the mid-level features comes from the supervised information and not from the extra layer of the architecture: the unsupervised mid-level features perform worse than the SIFT baseline. And, third, that encoding which part of the characters the blocks overlap with is more informative than just encoding with which characters they do. Combining the labels at different levels before learning the CCA can also give a slight edge over the other setups. This combined setup is the one that is used through the rest of the described experiments.

TABLE 1

Baseline results on query by example.

| | IIIT5K | | SVT | |
| --- | --- | --- | --- | --- |
| | mAP | P@1 | mAP | P@1 |
| SIFT | 25.30 | 46.15 | 23.35 | 32.33 |
| Unsup. mid-level | 19.64 | 37.48 | 17.76 | 24.47 |
| Sup. mid-level [SP1 char. region] | 31.13 | 49.51 | 25.47 | 31.42 |
| Sup. mid-level [SP2 char. region] | 38.50 | 56.78 | 33.03 | 41.99 |
| Sup. mid-level [SP4 char. region] | 41.08 | 58.97 | 34.87 | 43.81 |
| Sup. mid-level [SP1 + SP2 + SP4 char. region] | 41.28 | 59.40 | 35.22 | 45.02 |

The second set of experiments presents observations related to measuring how state-of-the-art methods based on representations that use SIFT features can benefit from these supervised features. In particular, it focuses on the recent work of J. Almazán, A. Gordo, A. Fornés, and E. Valveny, "Word spotting and recognition with embedded attributes", Technical report, 2014. This work uses Fisher vectors on SIFT descriptors as a building block to learn character attributes. Images are then described by the attribute scores. This attributes representation is then projected into an embedded space correlated with embedded text strings using CCA, which improves its discriminative power while reducing its dimensionality. Images and strings can then be compared using a cosine similarity. This approach can be used for retrieval, using both images or text strings as queries, but also for recognition, and achieved very competitive results. Since the approach is already based on Fisher vectors, it is easy to replace them with Fisher vectors computed using the mid-level features and measure exactly the contribution of those mid-level features. The authors of J. Almazán, A. Gordo, A. Fornés, and E. Valveny, "Word spotting and recognition with embedded attributes", Technical report, 2014, published their code, see http://www.cvc.uab.es/almazan/index.php/projects/words-att/, which makes this change easy to implement. Also explored is the option of combining both representations, since the information of SIFT and the mid-level features could be complementary. To do so, the global representations based on SIFT and mid-level features are concatenated, obtaining feature vectors of 49,152 dimensions. Evaluation is performed on three tasks: query by example (QBE)—i.e, image-to-image retrieval —, query by string (QBS) i.e, text-to-image —, and recognition—i.e, image-to-text. In QBS, the query is a text string and the goal is to retrieve all the images in the dataset that match the query. Used are the transcriptions of all words in the test set as queries. The accuracy of the QBE and QBS tasks is measured in terms of mean average precision. Recognition is evaluated using the small lexicon in IIIT5K and SVT, and the medium lexicon in IIIT5K, since SVT only has a small lexicon. The recognition task is measured in terms of precision at 1.

In Table 2 reported are the retrieval results on IIIT5K and SVT using the framework of J. Almazán, A. Gordo, A. Fornés, and E. Valveny, "Word spotting and recognition with embedded attributes", Technical report, 2014. As in J. Almazán, A. Gordo, A. Fornés, and E. Valveny, "Word spotting and recognition with embedded attributes", Technical report, 2014, the final dimensionality of the vectors is fixed to 96 dimensions. Note that this final dimensionality is independent of the Fisher vector dimensionality that is computed.

TABLE 2

Retrieval results on IIIT5K and SVT datasets.

| Dataset | Method | QBE | QBS |
|---|---|---|---|
| IIT5K | Label Embedding [24] | 43.7 | — |
| | SIFT Word Attributes [4] | 64.73 | 67.95 |
| | [Disclosed Mid-features] + Word Attributes | 73.07 | 75.74 |
| | [Disclosed Mid-features] + SIFT + Word Attributes | 72.99 | 75.43 |
| SVT | SIFT Word Attributes [4] | 56.86 | 80.90 |
| | [Disclosed Mid-features] + Word Attributes | 59.18 | 83.32 |
| | [Disclosed Mid-features] + SIFT + Word Attributes | 62.09 | 84.50 |

Observed is how, on both datasets, using supervised mid-level features significantly improves over using SIFT features directly both on QBE and QBS tasks. For the SVT dataset, the improvements brought by the mid-level features, albeit still large, are more modest than on IIIT5K. For comparison purposes, reported results on query by example and query by string on both datasets were those of J. Almazán, A. Gordo, A. Fornés, and E. Valveny, "Word spotting and recognition with embedded attributes", Technical report, 2014, were used to show how using mid-level features can provide significant improvements.

As shown in Table 3, compared also were results on recognition. Relative to IIIT5K, J. Almazán, A. Gordo, A. Fornés, and E. Valveny, "Word spotting and recognition with embedded attributes", Technical report, 2014, which are improved due to these mid-level features. Although the improvements with the small lexicon are modest (89.53 with SIFT vs 91.90 with mid-features), the improvements on the more difficult, medium lexicon are more significative: 76.57 vs 82.80. For SVT, the best known reported results are those of Google's PhotoOCR, see A. Bissacco, M. Cummins, Y. Netzer, and H. Neven, "PhotoOCR: Reading Text in Uncontrolled Conditions", in ICCV, 2013, which uses millions of training samples annotated at the character level. The results provided herein are comparable or better, but using only a fraction of the training data, and using low-dimensional signatures (96 dimensions) that can be used for other tasks.

TABLE 3

Recognition accuracy on the IIIT5K and SVT datasets.

| Dataset | Method | |y| = 50 | |y| = 1000 |
|---|---|---|---|
| IIIT5K | High Order Language Priors | 64.10 | 57.50 |
| | Label Embedding | 76.10 | 57.40 |
| | Strokelets | 80.20 | 69.3 |
| | SIFT Word Attributes | 89.53 | 76.57 |
| | [Disclosed Mid-features] + Word Attributes | 91.90 | 82.80 |
| | [Disclosed Mid-features] + SIFT + Word Attributes | 91.96 | 83.00 |

TABLE 3-continued

Recognition accuracy on the IIIT5K and SVT datasets.

| Dataset | Method | |y| = 50 | |y| = 1000 |
|---|---|---|---|
| SVT | ABBY | 35.00 | — |
| | Mishra et al | 73.26 | — |
| | Synthesized Queries | 77.28 | — |
| | Strokelets | 75.89 | — |
| | SIFT Word Attributes | 88.72 | — |
| | PhotoOCR | 90.39 | — |
| | [Disclosed Mid-features] + Word Attributes | 89.65 | — |
| | [Disclosed Mid-features] + SIFT + Word Attributes | 91.19 | — |

Some portions of the detailed description herein are presented in terms of algorithms and symbolic representations of operations on data bits performed by conventional computer components, including a central processing unit (CPU), memory storage devices for the CPU, and connected display devices. These algorithmic descriptions and representations are the means used by those skilled in the data processing arts to most effectively convey the substance of their work to others skilled in the art. An algorithm is generally perceived as a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise, as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The exemplary embodiment also relates to an apparatus for performing the operations discussed herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the methods described herein. The structure for a variety of these systems is apparent from the description above. In addition, the exemplary embodiment is not described with reference to any particular programming language. It will be appreciated that a variety of programming languages may be used to implement the teachings of the exemplary embodiment as described herein.

A machine-readable medium includes any mechanism for storing or transmitting information in a form readable by a machine (e.g., a computer). For instance, a machine-readable medium includes read only memory ("ROM"); random access memory ("RAM"); magnetic disk storage media; optical storage media; flash memory devices; and electrical, optical, acoustical or other form of propagated signals (e.g., carrier waves, infrared signals, digital signals, etc.), just to mention a few examples.

The methods illustrated throughout the specification, may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A computer-implemented method for generating a visual feature to semantic space transformation map using a set of text images, each text image including one or more annotated character bounding boxes, the method comprising:
   a) extracting a plurality of image patch descriptors representative of a plurality of respective image patches representative of the text images, the plurality of image patches including a background and a foreground area associated with the text images;
   b) computing a plurality of aggregated representations of the image patch descriptors, each aggregated representation associated with an image block including two or more image patches;
   c) computing character annotations associated with each image block by measuring a proximate relationship of an image block with an annotated character bounding box; and
   d) generating the visual feature to semantic space transformation map by constructing an intermediate subspace which maps the aggregated representations associated with the image blocks computed in step b) to the character annotations associated with each image block computer in step c).

2. The computer-implemented method for generating a visual feature to semantic space transformation map according to claim 1, wherein the method generates a plurality of global image representations for a plurality of respective text images.

3. The computer-implemented method for generating a visual feature to semantic space transformation map according to claim 1, wherein the text image includes a word, the image patch descriptors are based on SIFT (Scale-Invariant Feature Transform) descriptors and the image blocks are FV (Fisher Vector) encoded.

4. The computer-implemented method for generating a visual feature to semantic space transformation map according to claim 1, wherein step b) encodes the image blocks using FV over SIFT descriptors with a spatial pyramid.

5. The computer-implemented method for generating a visual feature to semantic space transformation map according to claim 1, wherein the proximate relationship is associated with an overlap of an image block with an annotated character bounding box.

6. The computer-implemented method for generating a visual feature to semantic space transformation map according to claim 5, wherein the overlap is associated with one of a percentage of a character covered by an image block, a percentage of a character bounding box covered by an image block and a percentage of an image block covered by a character bounding box.

7. The computer-implemented method for generating a visual feature to semantic space transformation map according to claim 1, wherein the one or more annotated bounding boxes include one or more annotations associated with a character label.

8. The computer-implemented method for generating a visual feature to semantic space transformation map according to claim 1, wherein the intermediate subspace is constructed using one of CCA (Canonical Correlation Analysis), Ridge Regression and Neural Networks.

9. The computer-implemented method for generating a visual feature to semantic space transformation map according to claim 1, wherein:
   the proximate relationship is associated with a maximum percentage of a character bounding box overlapping an image block, $$y^d = \max_{(char\_bb_i, char\_y_i) \in C_l} \delta_{i,d} \frac{|\text{Intersection}(block\_bb, char\_bb_i)|}{|char\_bb_i|},$$

where $y^d$ represents d dimension of label y, |•| represents an area of an overlapping region, and $\delta_{i,d}$ equals 1 if $char\_y_i = \Sigma_d$ and 0 otherwise.

10. The computer-implemented method for generating a visual feature to semantic space transformation map according to claim 9, wherein $$\hat{y}^{d,r} = \max_{(char\_bb_i, char\_y_i) \in C_l} \delta_{i,d} \frac{|\text{Intersection}(block\_bb, char\_bb_{i,r})|}{|char\_bb_{i,r}|},$$

where r=1 ... $R^2$ and $char\_bb_{i,r}$ denotes the r-th region of character boundary box char_bb.

11. An image processing system comprising memory storing instructions for performing the computer-implemented method for generating a visual feature to semantic space transformation map according to claim 1, and a processor operatively communicating with the memory which executes the instructions.

12. A computer program product comprising a non-transitory recording medium storing instructions, which when executed on a computer causes the computer to perform the method for generating a visual feature to semantic space transformation map according to claim 1.

13. A system for generating a visual feature to semantic space transformation map using a set of text images, the text image including one or more annotated character bounding boxes, the system comprising:
- a descriptor extractor which extracts a plurality of image patch descriptors representative of a plurality of respective image patches representative of the text images, the plurality of image patches including a background and a foreground area associated with the text image;
- an aggregator which computes a plurality of aggregated representations of the image patch descriptors, each aggregated representation associated with an image block including two or more image patches;
- character annotator which computes character annotations associated with each image block by measuring a proximate relationship of an image block with an annotated character bounding box;
- a visual feature to semantic space transformation map generator which generates the transformation map by constructing an intermediate subspace which maps the aggregated representation associated with the image blocks computer to the character annotations associated with each image block; and
- a processor which implements the descriptor extractor, the aggregator, the character annotator and the visual feature to semantic space transformation map generator.

14. A computer-implemented method for generating a global image representation of a text image, the method comprising:
- a) extracting a plurality of image patch descriptors representative of a plurality of respective image patches representative of the text image, the plurality of image patches including a background area and a foreground area associated with the text image;
- b) computing a plurality of aggregated representations of the image patch descriptors, each aggregated representation associated with an image block including two or more image patches;
- c) determining character annotations associated with each image block by projecting each image block's aggregated representation computer in step b) into an intermediate subspace associated with training text images including one or more annotated character bounding boxes, the intermediate subspace mapping visual features to a semantic space; and
- d) associating the determined character annotation with each respective image block associated with the text image to generate the global image representation of the text image.

15. The computer-implemented method for generating a global image representation of a text image according to claim 14, the intermediate subspace constructed with a plurality of training text images, each training text image including one or more annotated character bounding boxes, the method comprising:
- c1) extracting a plurality of image patch descriptors representative of a plurality of respective image patches representative of the training text images, the plurality of image patches including a background and a foreground area associated with the training text image;
- c2) computing a plurality of aggregated representations of the image patch descriptions, each aggregated representation associated with an image block including two or more image patches;
- c3) computing character annotations associated with each image block by measuring a proximate relationship of an image block with an annotated character bounding box;
- c4) generating the intermediate subspace by mapping the aggregated representations associated with the image blocks computed in step c2) to the character annotations associated with each image block computed in step c3).

16. The computer-implemented method for generating a global image representation of a text image according to claim 14, wherein the text image includes a word, the image patch descriptors are based on SIFT (Scale-Invariant Feature Transform) descriptors and the image blocks are FV (Fisher Vector) encoded.

17. The computer-implemented method for generating a global image representation of a text image according to claim 14, wherein step b) and step c2) encodes the image blocks using FV over SIFT descriptors with a spatial pyramid.

18. The computer-implemented method for generating a global image representation of a text image according to claim 15, wherein the proximate relationship is associated with an overlap of an image block with an annotated character bounding box.

19. The computer-implemented method for generating a global image representation of a text image according to claim 18, wherein the overlap is associated with one of a percentage of a character covered by an image block, a percentage of a character bounding box covered by an image block and a percentage of an image block covered by a character bounding box.

20. The computer-implemented method for generating a global image representation of a text image according to claim 14, wherein the one or more annotated bounding boxes include one or more annotations associated with a character label.

21. The computer-implemented method for generating a global image representation of a text image according to claim 14, wherein the intermediate subspace is constructed using one of CCA (Canonical Correlation Analysis), Ridge Regression and Neural Networks.

22. The computer-implemented method for generating a global image representation of a text image according to claim 14, wherein the proximate relationship is associated with a maximum percentage of a character bounding box overlapping an image block, $$y^d = \max_{(char\_bb_i, char\_y_i) \in C_l} \delta_{i,d} \frac{|\text{Intersection}(block\_bb, char\_bb_i)|}{|char\_bb_i|},$$

where $y^d$ represents d dimension of label y, $|\cdot|$ represents an area of an overlapping region, and $\delta_{i,d}$ equals 1 if $char\_y_i = \Sigma_d$ and 0 otherwise.

23. The computer-implemented method for generating a global image representation of a text image according to claim 22, wherein $$\hat{y}^{d,r} = \max_{(char\_bb_i, char\_y_i) \in C_l} \delta_{i,d} \frac{|\text{Intersection}(block\_bb, char\_bb_{i,r})|}{|char\_bb_{i,r}|},$$

where r=1 ... $R^2$ and char_bb$_{ir}$ denotes the r-th region of character boundary box char_bb.

24. An image processing system comprising memory storing instructions for performing the computer-implemented method for generating a global image representation of a text image according to claim 14, and a processor operatively communicating with the memory which executes the instructions.

25. A computer program product comprising a non-transitory recording medium storing instructions, which when executed on a computer, causes the computer to perform the method for generating a global image representation of a text image according to claim 14.

26. A system for generating a global image representation of a text image the system comprising:
- a descriptor extractor which extracts a plurality of respective image patches representative of the text image, the plurality of image patches including a background area and a foreground area associated with the text image;
- an aggregator which computes a plurality of aggregated representations of the image patch descriptors, each aggregated representation associated with an image block including two or more image patches;
- a character annotator which determines character annotations associated with each image block's aggregated representation into an intermediate subspace associated with training test images, the intermediate subspace mapping aggregated representations associated with training text image blocks to respective character annotations associated with each training text image block; and
- a global image representation generator which associates the determined character annotations with each respective image block associated with the text image to generate the global image representation of the text image.

* * * * *